July 7, 1953
G. W. A. AGAR
2,644,217
METHOD OF AND APPARATUS FOR THE MANUFACTURE
OF ROOFING TILES AND THE LIKE
Filed Sept. 23, 1949
3 Sheets-Sheet 1
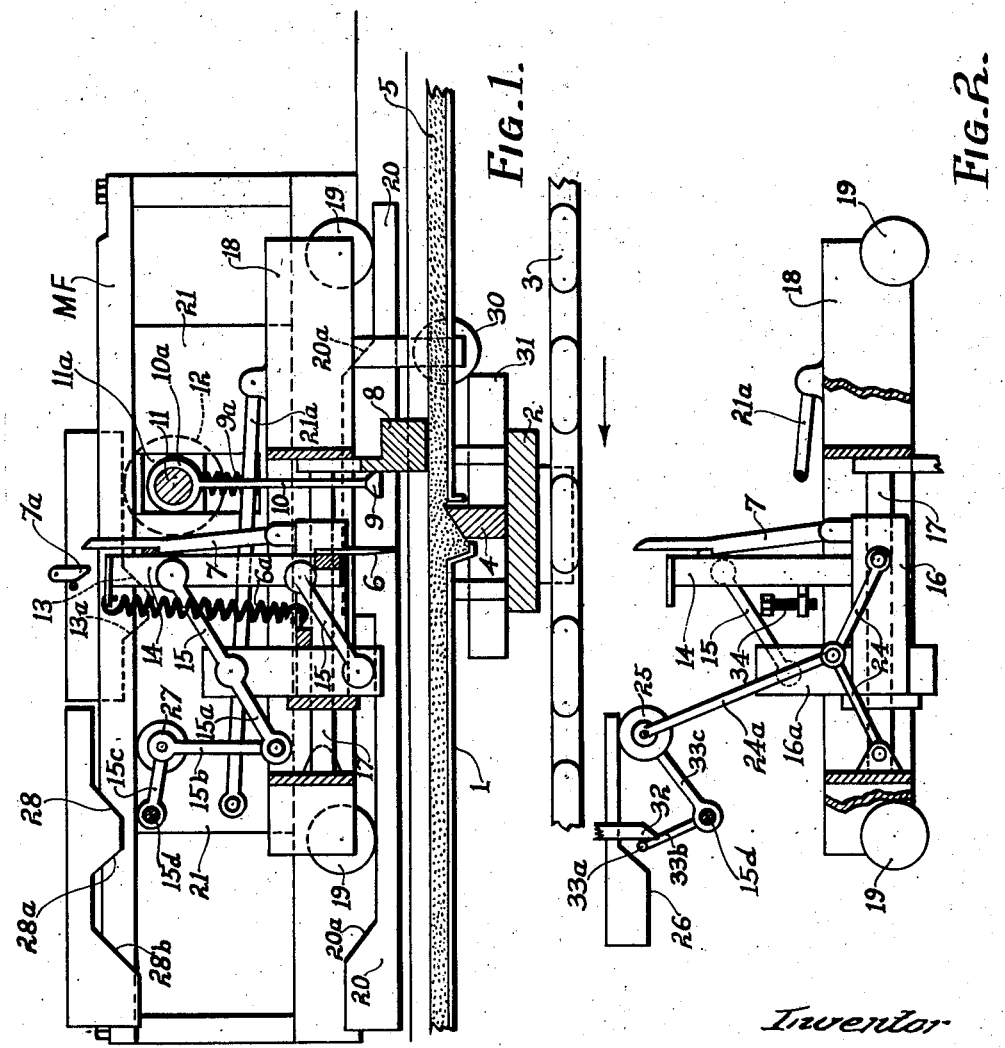
Inventor
George W. A. Agar
By [signature]
Atty.

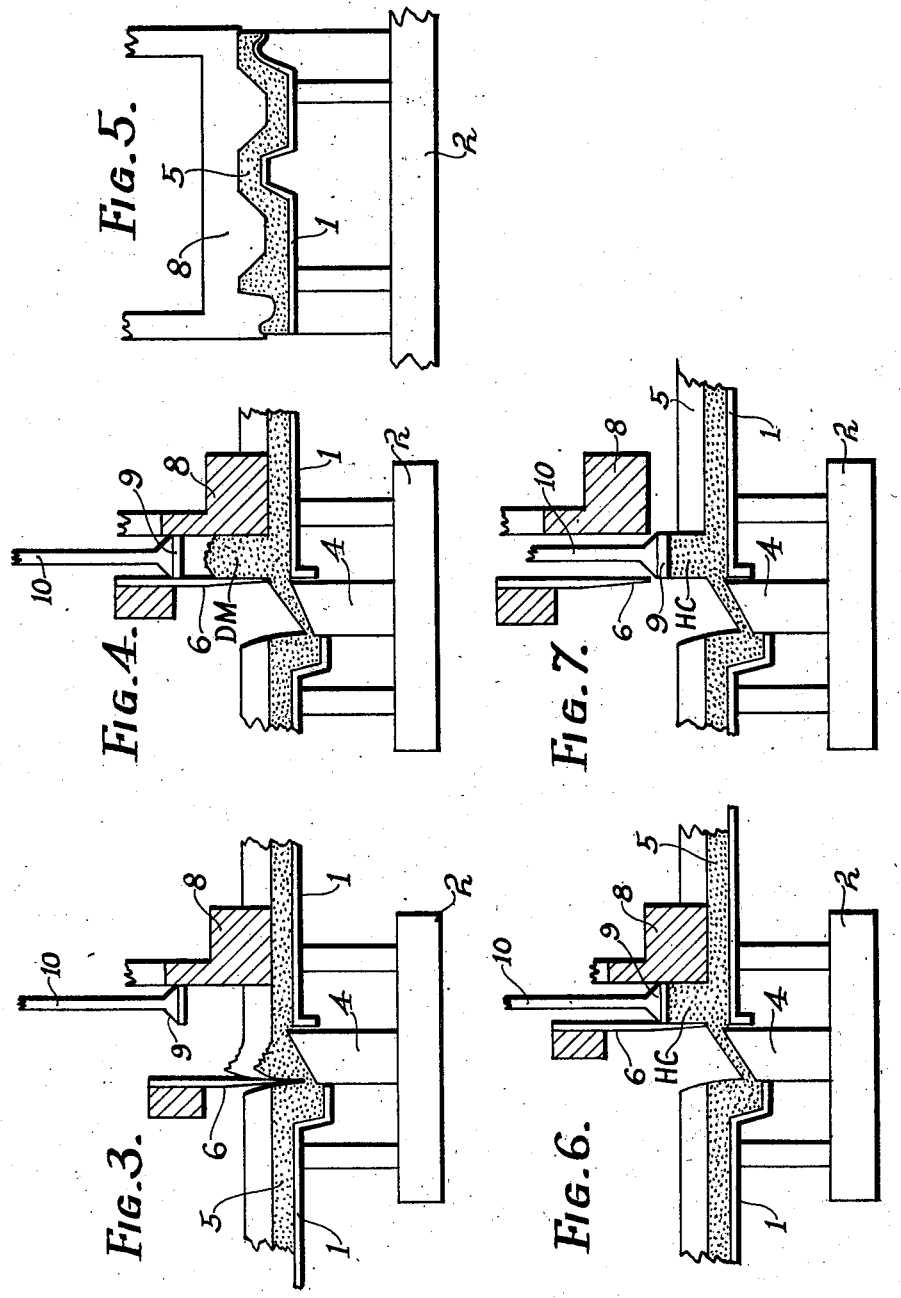

July 7, 1953 G. W. A. AGAR 2,644,217
METHOD OF AND APPARATUS FOR THE MANUFACTURE
OF ROOFING TILES AND THE LIKE
Filed Sept. 23, 1949 3 Sheets-Sheet 3
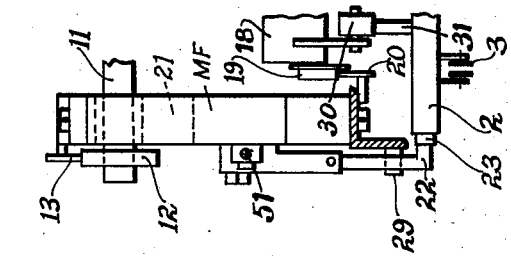
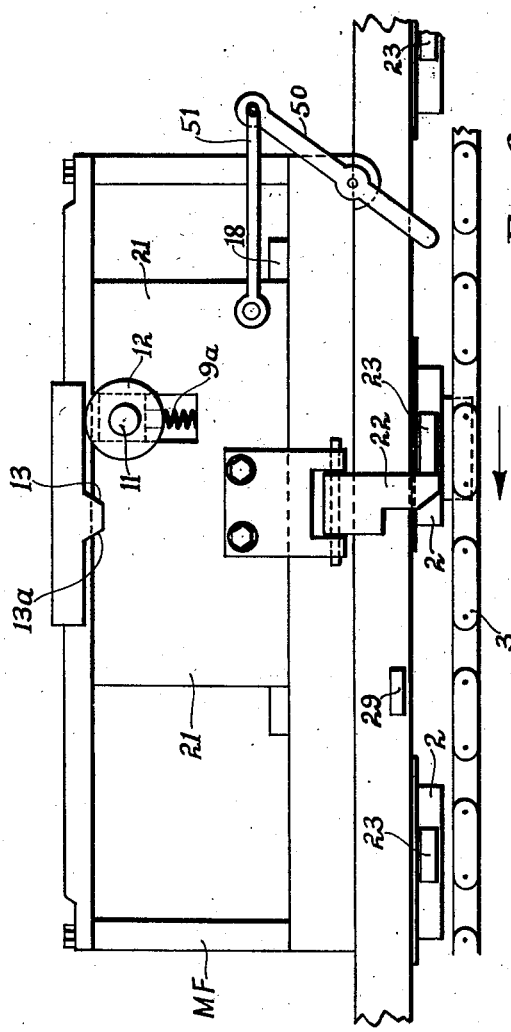
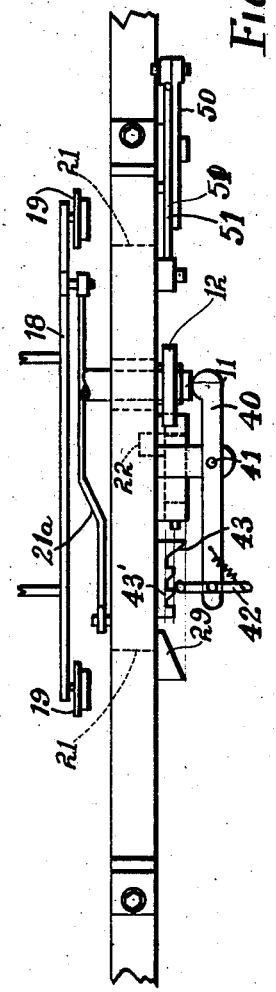
Inventor
George W. A. Agar Patented July 7, 1953

2,644,217

UNITED STATES PATENT OFFICE 2,644,217

METHOD OF AND APPARATUS FOR THE MANUFACTURE OF ROOFING TILES AND THE LIKE

George W. A. Agar, Wellington, New Zealand

Application September 23, 1949, Serial No. 117,427
In Australia September 29, 1948

15 Claims. (Cl. 25—43)

This invention relates to the manufacture of roofing tiles and the like from cementitious or other such plastic materials, wherein the plastic material is fed onto travelling mould plates carried by the upper stretch of an endless conveyor and, while travelling on the mould plates, is subjected to shaping or moulding and compressing operations.

A method and apparatus of that class is disclosed in Australian specification No. 105,651 and has, in general, been found to be satisfactory in operation. At the same time, practical experience has shown that certain improvements are desirable in order to simplify construction and operation of such apparatus, reduce maintenance costs and to obtain tiles of the highest quality.

The present improvements are directed more particularly to an improved method and means for severing the travelling web of plastic material into tiles and for forming integral upstanding backs or projections, commonly known as "head locks" or "head checks," and referred to hereinafter as "head checks," on a transverse end or edge of each tile.

The method comprises the steps of transversely cutting the web by causing a knife to descend while it is travelling bodily in the same direction and at the same speed as the web, in order to sever the web, causing the knife to move rearwardly and upwardly at the conclusion of its cutting stroke so as to displace some of the plastic material upwardly above the upper surface of the tile, and subjecting said displaced material to downward pressure so that it is consolidated in the form of a "head check" upon the new leading edge of the web formed by the cutting action.

The above and various other actions that are preferably included in the method will be clearly explained hereinafter with reference to the accompanying drawings, which illustrate, somewhat diagrammatically, mechanism according to a preferred practical embodiment of the invention. In these drawings—

Figure 1 is a side elevation of the mechanism with some parts in section and others broken away. This figure shows the movable parts in positions occupied just before they commence their cycle of operations.

Figure 2 is another side elevation illustrating certain parts, some of which are not seen in Figure 1.

Figures 3 to 7 inclusive are enlarged detail views illustrating the actions involved and the movements of the relevant parts in severing the tile length and forming the integral head check.

Figure 8 is a side elevation, illustrating in particular a main slide, a frame therefor and certain parts which co-operate with the slide.

Figure 9 is an end view of Figure 8.

Figure 10 is a plan view of Figure 8.

The travelling mould plates 1 are supported at their adjacent ends on a carrier 2 attached to the upper stretch of an endless conveyor 3 which may be constituted by a pair of laterally spaced and interconnected chains extending around sprockets (not shown) at opposite ends of the apparatus. Each carrier 2 has a transverse dividing bar 4 which upstands between the adjacent ends of the mould plates. The top surface of this dividing bar is sloped backwards and upwards, as shown, relative to the direction of travel of the mould plates and web, as denoted by the arrow in Figure 1.

The mechanism for severing the web 5 into tile lengths and forming the head checks is mounted upon a main slide 21 capable of being moved backwards and forwards in a plane parallel to the travel of the plastic web 5 and mould plate 1.

The slide 21 may comprise rigid plates or like members extending one at each side of the machine and interconnected by suitably placed cross members (not shown). The slide is guided in its movements by appropriate parts of the main frame MF of the machine.

At a suitable time, whilst being carried forward with and at the same speed as the tile, a knife 6, which may be suitably profiled at its lower or cutting edge as dictated by any longitudinal grooving or shaping of the web of plastic material, is released by tripping of a spring-loaded retaining latch 7 and is caused to descend smartly under the action of transversely spaced springs 6a so as to pass through the web 5 at a point above the leading edge of the dividing bar 4 (Figure 3). After this cutting action, which forms a new leading edge for the web 5, the knife is caused to travel in a backward and upward path to a point above the upper and trailing edge of the member 4 (Figure 4), carrying with it a portion of the web material from above this member.

At this stage, the knife is held in position at a predetermined distance in advance of the stop bar 8, the under surface of which is profiled to fit the contour of the top surface of the tile (Figure 5).

Between the knife 6 and the stop bar 8, there is disposed a transversely extending presser bar 9 carried at the lower end of a dropper 10 depending from a sleeve 10a encircling a shaft 11 which is journalled in bearings 11a vertically slidable in guides and through which bearings the shaft may be moved axially or lengthwise for a reason to be mentioned hereinafter.

Before the knife 6 descends and whilst it is being moved backwards and upwards towards the stop bar 8, the presser bar 9 is held up by one or more springs 9a clear of the plastic material displaced by the backward and upward movement of the knife (Figure 4). The presser bar 9 is then caused to descend and compress the displaced material (Figure 6) by the action of rollers 12, one at each end of shaft 11, engaging inverted ramps 13 (Figures 1 and 8) in the course of the forward movement of the mechanism with the tile web 5.

To achieve the sequence of operation thus far described, the knife is affixed to the lower edge of a bracket 14 connected by pantograph arms or parallel levers 15 (giving a substantially parallel motion to the knife) to posts 16a upstanding from an inner cradle 16 which is slidable, in a plane parallel with the tile web 5, along rods 17 carried by an outer cradle 18. The pantograph arms are duplicated at each side of the machine.

This outer cradle 18 is supported by means of rollers 19 running on fixed tracks 20 and is caused to move longitudinally with the main slide 21 as by being connected thereto by links 21a.

The slide 21 is caused to move forwardly at the same speed as the tile web 5 by the engagement of hinged triggers 22 (Figures 8, 9 and 10) with pusher blocks 23 suitably placed on the ends of each mould plate carrier 2 so that the knife 6 is properly positioned over the leading edge of the dividing bar 4.

Returning to Figure 1, as the slide 21 and mechanism thereon is moved forwardly with the tile web 5, the upper end of the spring loaded latch 7 engages a striker 7a mounted upon a stationary part whereby the knife bracket 14 is released and forced downwardly by the springs 6a so that the knife passes through, or substantially through, the travelling web 5 (Figure 3).

Backward movement of the knife may be achieved by the straightening of a pair of toggle levers 24 attached at their outer ends respectively to the outer cradle 18 and the slidable inner cradle 16 (see Figure 2), thus moving the knife backwards and retaining it by the toggle levers forming a straight line, at the correct distance from the stop bar 8, i. e. slightly in advance of the leading edge of the presser bar 9 (Figure 4). In this condition, the knife and the stop bar provide between them a space for accommodating the displaced material DM to be formed into the head check.

The toggle levers may be straightened at the appropriate time by depression of their inner articulated ends by a rod 24a carrying at its upper end a roller 25 which is caused by the forward motion of the mechanism to pass under an inverted fixed ramp 26 (Figure 2).

The upward motion of the knife is caused by reverse movement of the pantograph levers 15. Thus, one lever of each pair may have an extension 15a (Figure 1) connected at its outer end to a link 15b which is connected to another link 15c, the remote end of which encircles a transversely extending spindle 15d supported by slide 21. A roller 27 is mounted at the junction of the links 15b, 15c and, as a result of the down stroke of the knife, is raised from the position of Figure 1 into the path of an inverted ramp 28 so that continued forward motion of slide 21 causes the knife 6 to be raised so that its lower edge will be approximately flush with the upper surface of the web 5.

After the presser bar 9 has descended, as already described, and compressed the displaced material to form a head check HC (Figures 6 and 7) at the new leading end of the tile web 5, the rollers 19 simultaneously engage the longitudinally spaced ramps 20a on their respective tracks 20 which raise the inner and outer cradles 16, 18, together in relation to the tile web and the slide 21. The stop bar 8 and the knife 6 are also raised with the cradles whilst the presser bar 9, being mounted upon the slide 21, remains in contact with the top surface of the newly formed head check (Figure 7).

In order to maintain the knife in a relatively stationary position with relation to the rising cradles, the inverted ramp 28 is followed by an upswept ramp 28a (Figure 1) for co-operation with roller 27.

When sufficient height has been attained to clear the knife 6 and stop bar 8 from the moulded head check, wheels 19 of cradle 18 will have arrived at the upper ends of ramps 20a so that the cradle can continue to move forwardly on a level path.

The inverted ramps 13 (Figures 1 and 8) which caused the presser bar 9 to be depressed are followed by upswept ramps 13a, allowing the bar 9 to rise under the action of its lifting springs 9a. At the same time, a lateral and horizontal movement may be imparted to the presser bar shaft 11 so that the bar 9 leaves the top surface of the moulded head check with a lateral sliding motion that assists a clean break from the moulded material and smooths the upper surface thereof. Such lateral motion of the shaft may be imparted by any suitable automatic means such as a lever 40 pivoted at 41 to the slide 21 so as to move in a lateral and horizontal plane, one end of which engages by means of a spring actuated pawl 42 with a suitable inclined ramp 43 fixed on the main frame MF while the other end engages shaft 11.

If found desirable, this lever may be caused to pass over a series of closely spaced ramps or corrugations 43' so as to impart a reciprocating lateral motion to the shaft and presser bar, before the latter commences to recede upwardly from the head check.

During the final forward movement of the mechanism and after all other moulding actions just described have been completed, the knife is elevated still further by the roller 27 engaging another inverted ramp 28b (Figure 1) to allow the trigger 7 to re-engage the knife bracket 14 and hold the knife in a re-set or raised position (Figure 1) ready to repeat the operations on the next tile.

When this has been accomplished, the hinged triggers 22 on the slide 21 (Figures 8, 9 and 10) are caused to disengage from the pusher blocks 23 by coming in contact with outwardly widening wedges 29, and the tile with the moulded head check passes freely under the now stationary and elevated cradle.

The web cutting and head check forming mechanism is now free to return to its original starting position to repeat the same cycle of operations at the junction of the next two tiles and this may be automatically effected by means of a system of reversing levers. According to one method of obtaining this reverse motion, the pusher blocks 23 on each forwardly moving carrier 2 acts on the lower end of a pair of levers 50, pivoted on the main frame MF, causing their upper ends to move in the opposite direction and these upper ends, being connected to the main slide 21 by means of suitable connecting rods 51, return the slide 21 with parts mounted thereon to the original starting point.

Before the mechanism has completed its return stroke, the inner cradle 16 which was, during the forward stroke, forced backwards along the guide rods 17 within the outer cradle by toggle levers 24, must be returned to its original position. This may be accomplished by a striker lever 32 (Figure 2) mounted on a stationary part and adapted to engage a stud 33a projecting from arm 33b of a bell crank lever mounted to turn about spindle 15d. The other arm 33c of the bell crank is connected to roller 25 which is raised by engagement of the striker 32 with stud 33a, thereby raising the centre point of the toggle levers 24, to the position shown in Figure 2, and thus retracting the inner cradle to its original position.

It will be seen that to return the cradles 16 and 18 in this manner in the opposite direction to the travelling web 5 would cause the stop bar 8 to descend to the tile surface as soon as the rollers 19 had descended to the lower level of the ramps on tracks 20. To avoid this and consequent damage to the tile surface, auxiliary rollers 30 (Figures 1 and 9) may be mounted, one at each side, below the rear end of the outer cradle 18 so as to land on associated tracks 31 mounted on the carriers 2, thus holding up the rear (right hand) end of the cradle 18 and its contained mechanism by pivoting about the remote pair of rollers 19 and maintaining the other (left hand) pair somewhat above the tracks 20.

The rollers 30 run along the tracks (left to right) until momentarily before the carrier 2 reaches the point at which it picks up the triggers 22, when the rollers 30 leave the rear end of the carrier tracks 31 and the rear rollers 19 drop to their normal position on tracks 20 so the entire mechanism is ready to repeat the cycle of operations actuated by the next advancing carrier 2.

As will appear from Figures 3, 4, 6 and 7, it is not necessary for the knife 6 to cut completely through the web 5, as the relatively small uncut portion will readily break away. In order to vary the depth of cut and, consequently, the amount of material that will be displaced by the subsequent movement of the knife, the knife bracket may carry an adjustable stop 34 (Figure 2) adapted to engage some appropriate part within the outer carriage 18 and thus limit descent of the knife.

Having now described my invention, what I claim as new and desire to secure by Letters Patent is:

1. A method of severing a travelling web of plastic material into tile lengths and of forming integral head checks on the respective transverse edges of the tiles, comprising the steps of transversely cutting the travelling web by causing a knife to descend while it is travelling bodily in the same direction and at the same speed as the web and then moving said knife upwardly and rearwardly upon completion of its cutting stroke in order to cut the web transversely and then displacing plastic material immediately to the rear of the cut rearwardly and upwardly so that it comes to rest upon the upper surface of the tile web, and subjecting said displaced material to downward pressure so that it is moulded and consolidated in the form of a head check upon the new leading edge of the travelling web.

2. A method according to claim 1 which includes the features of applying said downward pressure to the displaced material by a vertically movable presser member while the latter is moving forwardly in unison with the travelling web, imparting lateral reciprocatory movement to said presser member while it is maintained in contact with the head check, and subsequently raising the presser member from the head check.

3. Apparatus for severing a travelling web of plastic material into tiles and for forming integral head checks on the respective transverse edges of the tiles, comprising a knife located above the web, means for moving the knife forwardly in unison with the travelling web, means causing the knife to descend and sever the web, means for moving said knife longitudinally through the web at the conclusion of the cutting action to push plastic material immediately at the cut made by the knife so that the material is squeezed above the upper surface of the web, and means travelling in unison with the web for subjecting the material that is displaced above the surface of the web to downward pressure so that it is moulded and consolidated in the form of a head check upon the edge of the travelling web.

4. Apparatus according to claim 3 and including a transverse stop bar disposed rearwardly of said knife and adapted to rest upon the upper surface of the tile web while moving forwardly in unison therewith, said stop bar limiting rearward movement of the material pushed by the longitudinal movement of the knife so that the material is squeezed upwardly thereby, a transversely extending presser bar located between said knife and said stop bar and mounted to move forwardly in unison with the travelling web, means for depressing said presser bar to mould and consolidate the displaced material into the form of a head check, and means for elevating said knife, said stop bar and said presser bar, at the completion of the moulding action.

5. Apparatus according to claim 3 and including a transverse stop bar disposed rearwardly of said knife and adapted to rest upon the upper surface of the tile web while moving forwardly in unison therewith, said stop bar being positioned to cooperate with said knife in confining therebetween the plastic material displaced by said knife, a transversely extending presser bar located between said knife and said stop bar and mounted to move forwardly in unison with the travelling web, means for depressing said presser bar to mould and consolidate the displaced material, and means for elevating said knife, said stop bar and said presser bar at the completion of the moulding operation, said elevating means being arranged to raise said knife and said stop bar clear of the upper surface of the head check before said presser bar is raised from the head check.

6. Apparatus according to claim 3 and including a transverse stop bar disposed rearwardly of said knife and adapted to rest upon the upper surface of the tile web while moving forwardly in unison therewith, said stop bar limiting rearward movement of the displaced material, a transversely extending presser bar located between said knife and said stop bar and mounted to move forwardly in unison with the travelling web, means for depressing said presser bar to mould and consolidate the displaced material into the form of a head check, means for imparting a lateral reciprocating movement to said presser bar while it is depressed, and means for elevating said knife, said stop bar and said presser bar at the completion of the moulding action.

7. Apparatus for severing a travelling web of plastic material into tiles and for forming integral head checks on the respective transverse edges of the tiles, comprising a knife located above the web, means for moving the knife forwardly in unison with the travelling web, means for causing the knife to descend and sever the web, means for displacing the knife longitudinally through the web to press the plastic material at one side of the cut so that the material is displaced upwardly to extend above the surface of the web, and means travelling in unison with the web for subjecting the displaced material to downward pressure so that it is moulded and consolidated in the form of a head check upon the new leading edge of the travelling web.

8. Apparatus for severing a travelling web of plastic material into tiles and for forming integral head checks on the respective transverse edges of the tiles, comprising a knife located above the web, means for moving the knife forwardly in unison with the travelling web, means for causing the knife to descend and sever the web, means for displacing the knife longitudinally through the web to press the plastic material at one side of the cut so that the material is displaced upwardly to extend above the upper surface of the web, and means travelling in unison with the web for subjecting the displaced material to downward pressure so that it is moulded and consolidated in the form of a head check upon the new leading edge of the travelling web, said knife and means for acting upon the travelling web and the material to be formed into the head check being carried by a slide adapted to be moved forwardly a predetermined distance in relation to and at the same speed as the travelling web and, in so doing, to bring into action means for actuating said members, means being provided to return said slide to its starting position with said members in positions ready to repeat their cycle of operations upon the travelling web.

9. Apparatus according to claim 8, including a latch device for normally retaining said knife in a raised position, spring means tending to force said knife downwardly, and a striker adapted upon forward movement of said slide to release said latch and thus allow the knife to descend under spring influence.

10. Apparatus according to claim 8, including a latch device for normally retaining said knife in a raised position, spring means tending to force said knife downwardly, and a striker adapted upon forward movement of said slide to release said latch and thus allow the knife to descend under spring influence, said knife being attached to a bracket which is supported by parallel levers connected at their respective ends to said bracket and a cradle movable horizontally with said slide and also capable of rising and lowering movement in relation thereto.

11. Apparatus according to claim 8, including a latch device for normally retaining said knife in a raised position, spring means tending to force said knife downwardly, and a striker adapted upon forward movement of said slide to release said latch and thus allow the knife to descend under spring influence, said knife being attached to a bracket which is supported by parallel levers connected at their respective ends to said bracket and a cradle movable horizontally with said slide and also capable of rising and lowering movement in relation thereto and also including a second cradle along which said first mentioned cradle is slidable, said second cradle being connected with said slide so as to move lengthwise therewith, and also adapted to rise and fall in relation thereto.

12. Apparatus according to claim 3 and including a transverse stop bar disposed rearwardly of said knife and adapted to rest upon the upper surface of the tile web while moving forwardly in unison therewith, said stop bar limiting rearward movement of the displaced material, a transversely extending presser bar located between said knife and said stop bar and mounted to move forwardly in unison with the travelling web, means for depressing said presser bar to mould and consolidate the displaced material into the form of a head check, and means for elevating said knife, said stop bar and said presser bar, at the completion of the moulding action, said knife and bars for acting upon the travelling web and the material to be formed into the head check being carried by a slide adapted to be moved forwardly a predetermined distance in relation to the framework of the apparatus at the same speed as the travelling web and, in so doing, to bring into action means for actuating said knife and bars, means being provided to return said slide to its starting position with said knife and bars in positions ready to repeat their cycle of operations upon the travelling web, said presser bar being mounted on said slide and being normally urged upwards by spring means, and a roller and ramp device being provided to force said presser bar downwards during portion of the forward movement of said slide.

13. The method of forming tiles with head checks, which comprises forming a substantially continuous web of tile-forming material in plastic condition, continuously advancing said web longitudinally, transversely cutting said web while advancing the line of cut with said web at substantially the same speed as the web to form a smooth cut, displacing the material immediately adjacent one side of the cut upwardly beyond the general plane of the web by pressing longitudinally of the web the material on one side of the cut while said material remains as a portion of the web, simultaneously compressing during the advancement of the web the opposed sides of the displaced material to form a transverse flange at right angles to the general plane of the web, and during the continuous advancement of the web compressing said flange toward said web to form a finished head check.

14. The method of forming tiles with head checks, which comprises forming a substantially continuous web of tile-forming material in plastic condition, continuously advancing said web longitudinally, transversely cutting said web while advancing the line of cut with said web at substantially the same speed as the web to form a smooth cut, pressing longitudinally of the web the material on one side of the cut while the material remains as a portion of the web and thereby squeezing and displacing said material upwardly beyond the general plane of the web to accumulate as a rib at the transverse edge of the web, confining the rib and applying pressure thereto during the continuous advancement of the web to form a finished head check.

15. The method of forming tiles with head checks, which comprises forming a substantially continuous web of tile-forming material in plastic condition, continuously advancing said web longitudinally, transversely cutting said web while advancing the line of cut with said web at substantially the same speed as the web to form a smooth cut, pressing in opposition to the movement of the web the material on one side of the cut while the material remains as a portion of the web and thereby squeezing and displacing said material upwardly beyond the general plane of the web to accumulate as a rib at the transverse edge of the web, confining the rib and applying pressure thereto during the continuous advancement of the web to form a finished head check.

GEORGE W. A. AGAR.

References Cited in the file of this patent

FOREIGN PATENTS

| Number | Country | Date |
|---|---|---|
| 7,418 of 1927 | Australia | May 21, 1928 |
| 105,651 | Australia | Oct. 27, 1938 |